United States Patent
Jewell et al.

(10) Patent No.: US 11,162,157 B2
(45) Date of Patent: *Nov. 2, 2021

(54) METHOD FOR RECOVERY OF METAL-CONTAINING MATERIAL FROM A COMPOSITE MATERIAL

(71) Applicant: Coogee Titanium Pty Ltd, Kwinana (AU)

(72) Inventors: Daniel Jewell, Kwinana (AU); Peter Duxson, Kwinana (AU)

(73) Assignee: Coogee Titanium Pty Ltd, Kwinana (AU)

( * ) Notice: Subject to any disclaimer, the term of this patent is extended or adjusted under 35 U.S.C. 154(b) by 9 days.

This patent is subject to a terminal disclaimer.

(21) Appl. No.: 15/540,725

(22) PCT Filed: Aug. 12, 2016

(86) PCT No.: PCT/AU2016/050745
§ 371 (c)(1),
(2) Date: Jun. 29, 2017

(87) PCT Pub. No.: WO2017/027914
PCT Pub. Date: Feb. 23, 2017

(65) Prior Publication Data
US 2018/0274059 A1    Sep. 27, 2018

(30) Foreign Application Priority Data
Aug. 14, 2015   (AU) .............................. 2015903278

(51) Int. Cl.
*C22B 9/02*    (2006.01)
*B22F 1/00*    (2006.01)
(Continued)

(52) U.S. Cl.
CPC ........ *C22B 34/1268* (2013.01); *B22F 1/0011* (2013.01); *C22B 5/04* (2013.01);
(Continued)

(58) Field of Classification Search
CPC .... C22B 5/02; C22B 5/16; C22B 9/02; C22B 9/04; C22B 34/1268; B22F 1/0011; B22F 2301/205; B22F 2304/10
See application file for complete search history.

(56) References Cited

U.S. PATENT DOCUMENTS

| 3,746,535 A | 7/1973 | Brandstatter |
| 3,779,742 A | 12/1973 | Fehling et al. |

(Continued)

FOREIGN PATENT DOCUMENTS

| CN | 85100812 A | 9/1986 |
| CN | 1522308 A | 8/2004 |

(Continued)

OTHER PUBLICATIONS

Joshi, Vineet V et al. "Development of Ti—6Al—4V and Ti—1Al—8V—5Fe Alloys Using Low-Cost TiH2 Powder Feedstock." Journal of Materials Engineering and Performance. vol. 22(4). April. pp. 995-1003. (Year: 2013).*

(Continued)

*Primary Examiner* — Scott R Kastler
(74) *Attorney, Agent, or Firm* — Michael Best & Friedrich LLP

(57) ABSTRACT

The invention provides a method for the recovery of a metal-containing product ($M_{Prod}$) comprising: providing a composite material comprising a matrix of oxidised reductant ($R_O$), a product metal ($M_P$) dispersed in the matrix of oxidised reductant ($R_O$), and one or more metal compounds ($M_PC_R$) of the product metal (Mp) in one or more oxidation states dispersed in the matrix of oxidised reductant ($R_O$); and (Continued)

treating the composite material to at least partially remove the one or more metal compounds ($M_PC_R$) from the matrix of oxidised reductant ($R_O$) to form the metal-containing product ($M_{Prod}$).

29 Claims, 3 Drawing Sheets

(51) Int. Cl.
| | |
|---|---|
| C22B 34/12 | (2006.01) |
| C22B 9/04 | (2006.01) |
| C22B 34/22 | (2006.01) |
| C22B 21/00 | (2006.01) |
| C22B 5/04 | (2006.01) |
| C22B 21/02 | (2006.01) |

(52) U.S. Cl.
CPC ............... *C22B 9/02* (2013.01); *C22B 9/04* (2013.01); *C22B 21/00* (2013.01); *C22B 21/02* (2013.01); *C22B 34/12* (2013.01); *C22B 34/22* (2013.01); *B22F 2301/205* (2013.01); *B22F 2304/10* (2013.01); *Y02P 10/20* (2015.11)

(56) References Cited

U.S. PATENT DOCUMENTS

| | | | |
|---|---|---|---|
| 4,279,641 A | 7/1981 | Skach, Jr. et al. | |
| 4,738,389 A | 4/1988 | Moshier et al. | |
| 5,032,176 A | 7/1991 | Kametani et al. | |
| 5,078,789 A | 1/1992 | Abodishish et al. | |
| 5,098,471 A | 3/1992 | Abodishish | |
| 5,498,446 A | 3/1996 | Axelbaum et al. | |
| 5,589,274 A | 12/1996 | Long et al. | |
| 5,641,424 A | 6/1997 | Ziolo et al. | |
| 5,958,106 A | 9/1999 | Armstrong | |
| 6,194,083 B1 | 2/2001 | Yasuda et al. | |
| 6,409,797 B2 | 6/2002 | Armstrong | |
| 6,712,952 B1 * | 3/2004 | Fray | C22B 21/0038 205/640 |
| 7,041,150 B2 | 5/2006 | Armstrong | |
| 9,840,753 B2 * | 12/2017 | Jewell | C22B 5/04 |
| 2003/0059603 A1 | 3/2003 | Gottfried et al. | |
| 2004/0123700 A1 | 7/2004 | Zhou et al. | |
| 2007/0178163 A1 | 8/2007 | Kodas et al. | |
| 2008/0307925 A1 | 12/2008 | Wellwood et al. | |

FOREIGN PATENT DOCUMENTS

| | | |
|---|---|---|
| CN | 100489128 C | 5/2009 |
| CN | 101454467 | 6/2009 |
| CN | 100557044 C | 11/2009 |
| CN | 102712966 | 10/2012 |
| CN | 102921953 | 2/2013 |
| GB | 694921 A | 7/1953 |
| GB | 827470 A | 2/1960 |
| JP | H0681051 | 3/1994 |
| JP | H0873906 A | 3/1996 |
| JP | 2000096160 A | 4/2000 |
| JP | 2001192711 A | 7/2001 |
| JP | 2002129250 A | 5/2002 |
| JP | 2002339006 | 11/2002 |
| JP | 2004283694 A | 10/2004 |
| JP | 2006045602 A | 2/2006 |
| JP | 2007523991 A | 8/2007 |
| JP | 2009132970 A | 6/2009 |
| KR | 20120074132 A | 7/2012 |
| WO | 2005/028145 A2 | 3/2005 |
| WO | 2006010223 A1 | 2/2006 |
| WO | WO-2006042360 A1 | 4/2006 |
| WO | 2008/067614 A1 | 6/2008 |
| WO | WO 2009054819 A1 * | 4/2009 |
| WO | WO-2011137489 A1 | 11/2011 |
| WO | 2013185153 A2 | 12/2013 |

OTHER PUBLICATIONS

Gong et al. "Melt Pool Characterization for Selective Laser Melting of Ti—6Al—4V Pre-alloyed Powder." Conference: 25th Annual International Solid Freefrom Fabrication Symposium. August, pp. 256-267. (Year: 2014).*
Evdokimov et al., "Magnesium Reduction of Titanium Tetrachloride," Inorganic Materials, 2002, 38:5; 490-493.
Supplementary European Search Report for related Application No. EP16836273 dated Jul. 27, 2018 (2 pages).
Supplementary European Search Report dated May 7, 2018 (2 pages).
Doblin, "Ongoing development of the TIRO process," CSIRO, 28th Annual ITA Conference, Atlanta, Georgia, Oct. 7-10, 2012 (15 pages).
International Search Report and Written Opinion for Application No. PCT/AU2016/050745 dated Nov. 7, 2016 (10 pages).
Wellwood, "Low Cost Titanium Powder Processes to Facilitate Near Net Shape Manufacture," CSIRO, 22nd Annual ITA Conference, San Diego, California, Oct. 1-3, 2006 (21 pages).
Traut, et al, "Coreduction of TiCl4 , AlCl3 , and VCl4 to Produce Titanium Alloy Sponge" Bureau of Mines Report of Investigations/ 1987, RI 9133 (22 pages).
Doblin, et al., "Titanium powder from the TiRO™ process", Key Engineering Materials, vol. 520., pp. 95-11, available online Aug. 24, 2012.
International Search Report and Written Opinion for Application No. PCT/AU2016/050747 dated Nov. 7, 2016 (9 pages).
International Search Report and Written Opinion for Application No. PCT/AU2016/050746 dated Nov. 7, 2016 (10 pages).
Japanese Patent Office Notice of Reasons for Refusal for Application No. 509590/2018 dated Jun. 2, 2020 (23 pages including English translation).
Japanese Patent Office Notice of Reasons for Refusal for Application No. 509595/2018 dated Jun. 2, 2020 (19 pages including English translation).
Guo Kui ed., "Introduction to Metallurgical Technology", Central South University Press, Aug. 31, 1991, pp. 340-350.
Chinese Patent Office Search Report for Application No. 201680058440X dated Aug. 20, 2019 (4 pages including statement of relevance).
Chinese Patent Office Search Report for Application No. 201600584772 dated Aug. 22, 2019 (4 pages including statement of relevance).

* cited by examiner

METHOD FOR RECOVERY OF METAL-CONTAINING MATERIAL FROM A COMPOSITE MATERIAL

FIELD OF INVENTION

The present invention relates to a method for the recovery of metal-containing material from a composite material. In particular, the invention relates to a method for the recovery of a metal-containing product ($M_{Prod}$) from a novel composite material comprising a matrix of oxidised reductant ($R_O$), a product metal ($M_P$) dispersed in the matrix of oxidised reductant ($R_O$) and one or more metal compounds ($M_PC_R$) of the product metal ($M_P$) in one or more oxidation states dispersed in the matrix of oxidised reductant ($R_O$).

BACKGROUND ART

International Publication No. WO 2006/042360 provides a method for producing titanium by reaction of titanium tetrachloride with magnesium in a reactor, which may comprise a fluidised bed. The temperature in the reactor is above the melting point of magnesium, but below the melting point of magnesium chloride. The method produces particles comprising titanium which are removed from the reactor and processed in order to recover titanium particles generally having a particle size of greater than 500 μm. Compliant with conventional thinking, the method of WO 2006/042360 is operated under an excess of magnesium with unreacted magnesium optionally collected and recycled to the reactor. This is understood to achieve complete conversion of TiCl₄ to titanium metal, while avoiding the formation of sub-chlorides, $TiCl_2$ and $TiCl_3$.

The applicant has identified methods for producing composite materials from at least one metal compound in which an excess of oxidant is fed to the reactor during processing. The composite material will generally be in finely divided form and the method, generally, does not place significant weight on the exclusion of by-products in the composite material. The methods for the production of the composite material are described in detail in a co-pending international patent application with the title "METHOD FOR THE PRODUCTION OF A COMPOSITE MATERIAL USING EXCESS OXIDANT", filed on the same date as the present application. The contents of the co-pending application are incorporated herein in their entirety.

The subject matter claimed herein is not limited to embodiments that solve any disadvantages or that operate only in environments such as those described above. Rather, this background is only provided to illustrate one exemplary technology area where some embodiments described herein may be practiced.

SUMMARY OF INVENTION

As mentioned above, the present invention relates generally to a method for the recovery of a metal-containing product ($M_{Prod}$) from a composite material.

According to one aspect of the invention there is provided a method for the recovery of a metal-containing product ($M_{Prod}$) comprising:

providing a composite material comprising a matrix of oxidised reductant ($R_O$), a product metal ($M_P$) dispersed in the matrix of oxidised reductant ($R_O$), and one or more metal compounds ($M_PC_R$) of the product metal ($M_P$) in one or more oxidation states dispersed in the matrix of oxidised reductant ($R_O$); and treating the composite material to at least partially remove the one or more metal compounds ($M_PC_R$) from the matrix of oxidised reductant ($R_O$) to form the metal-containing product ($M_{Prod}$).

For convenience, the term "composite material" will be used to describe a composite material that is a metal-salt composite, an alloy-salt composite or an inter-metallic-salt composite. That is, the term "composite material" as used herein is intended to include within its scope a composite comprising a salt and (i) a metallic element and a reduced metal compound of a metallic element, (ii) two or more metallic elements and reduced metal compounds of two or more metallic elements, and (iii) one or more metallic elements together with one or more non-metallic elements and one or more reduced metal compounds of one or more metallic elements.

In a similar way, the term "product metal" will be used to describe a product that is a metal, an alloy or an inter-metallic. That is, the term "product metal" as used herein is intended to include within its scope product comprising (i) one metallic element, (ii) two or more metallic elements, or (iii) one or more metallic elements together with one or more non-metallic elements.

As used herein the term "remove" will be used to describe physical removal of the one or more metal compounds ($M_PC_R$) from the matrix of oxidised reductant ($R_O$), such as by distillation or other physical mechanisms. It will also be used to describe conversion of the metal compounds ($M_PC_R$), for example by reduction.

Throughout this specification, unless the context requires otherwise, the word "comprise", or variations such as "comprises" or "comprising", will be understood to imply the inclusion of a stated step or element or integer or group of steps or elements or integers, but not the exclusion of any other step or element or integer or group of steps, elements or integers. Thus, in the context of this specification, the term "comprising" is used in an inclusive sense and thus should be understood as meaning "including principally, but not necessarily solely".

According to one embodiment of the invention, the treatment step comprises distilling the one or more metal compounds ($M_PC_R$) from the matrix of oxidised reductant ($R_O$). The distillation may further at least partially remove the oxidised reductant ($R_O$). In one embodiment, the treatment step comprises subjecting the composite material to conditions that result in volatilisation of the oxidised reductant ($R_O$). For example, the conditions may result in sublimation of the oxidised reductant ($R_O$).

The treatment step may comprise at least one of (i) volatilisation of the one or more metal compounds ($M_PC_R$), and (ii) reduction of the one or more metal compounds ($M_PC_R$) to the product metal ($M_P$).

According to one embodiment, the one or more metal compounds ($M_PC_R$) and, optionally, the oxidised reductant ($R_O$), are removed from the composite material by vacuum distillation. For example, the vacuum distillation may be carried out under inert conditions, such as under argon gas. If so, the inert (e.g. argon) gas is added, as a barrier gas, at a rate that is dependent on the scale of the operation and vacuum applied. According to this embodiment, the vacuum distillation may be conducted at a pressure of from 0.01 to 0.015 kPa. The vacuum distillation is preferably conducted at conditions at which sublimation of the oxidised reductant ($R_O$) occurs.

In one particular embodiment, the product metal ($M_P$) comprises titanium and the oxidised reductant ($R_O$) comprises magnesium chloride and the vacuum distillation is conducted at a temperature of from 700° C. to 950° C., and the product metal ($M_P$) optionally comprises at least titanium.

It has been found that treatment at relatively low pressures maintains the form of the product metal ($M_P$) recovered from the composite material. For example, if the composite material is particulate and comprises a plurality of small particles, as discussed in more detail below, treatment under these conditions may result in the recovery of product metal ($M_P$) in particulate form.

In another embodiment, the treatment step comprises reducing the one or more metal compounds ($M_PC_R$) of the product metal ($M_P$) to the product metal ($M_P$) in the presence of a reductant (R). The reductant (R) may be included within the matrix of oxidised reductant ($R_O$), and/or the reductant (R) may be combined with the composite material prior to or during the distillation.

In an alternative embodiment, the treatment step comprises melting at least the matrix of oxidised reductant of the composite material and recovering the metal-containing product ($M_{Prod}$) from the melt. The temperature at which melting is conducted will be somewhat predicated by the components of the matrix of oxidised reductant of the composite material. In certain embodiments melting may be conducted at a temperature below the individual melting temperatures of each component of the matrix by formation of compositions inclusive of hypoeutectic and hypereutectic compositions. In a preferred embodiment the composition of the components of the composite may form a eutectic composition. Melting may be conducted by introducing the composite material to a molten bath. The molten bath may be one of reduced melting point, for example a eutectic mixture.

In this embodiment, recovering the metal-containing product ($M_{Prod}$) from the melt may comprise subjecting the melt to conditions at which the product metal ($M_P$), the one or more metal compounds ($M_PC_R$) and the oxidised reductant ($R_O$) form separate layers in the melt and recovering the product metal ($M_P$) layer. For example, separation may comprise density separation, gravity separation or centrifugation. Recovery may also comprise dissolution of components of the composite material, such as the one or more metal compounds ($M_PC_R$) and oxidised reductant ($R_O$).

According to this embodiment of the invention, the form of the product metal ($M_P$) may not be maintained, but instead the ($M_P$) may be recovered and formed into, for example, ingots of the product metal ($M_P$).

The reductant (R) may be a solid, solid particulate, liquid or vapour. In certain embodiments, the reductant (R) is selected from the group consisting of Mg, Na, K, Li, Ba, Ca, Be and Al, although it is envisaged other options may also be suitable. In certain embodiments two or more reductants (R), which may include one or more metal reductant ($M_R$), may be present. In other embodiments, it is thought that the reductant (R) may suitably comprise a multi-component reductant, such as an alloy, for example an Mg—Al or Mg—Pd alloy. Generally, the composite material comprises up to 20 wt %, preferably up to 3 wt % of the reductant (R).

In certain embodiments, the one or more metal compounds ($M_PC_R$) of the product metal ($M_P$) in one or more oxidation states comprise one or more metal halides ($M_PX$) of the product metal ($M_P$). For example, the one or more metal compounds ($M_PC_R$) of the product metal ($M_P$) in one or more oxidation states may comprise a metal halide selected from the group consisting of halides of titanium, aluminum, vanadium, chromium, niobium, molybdenum, zirconium, silicon, boron, tin, hafnium, yttrium, iron, copper, nickel, bismuth, manganese, palladium, tungsten, cadmium, zinc, silver, cobalt, tantalum, scandium, ruthenium and the rare earths or a combination of any two or more thereof. The one or more metal compounds ($M_PC_R$) of the product metal ($M_P$) in one or more oxidation states may comprise at least two metal halides. If so, the metal halides may be preferably selected from the group consisting of halides of titanium, aluminum and vanadium.

In certain embodiments, the oxidised reductant ($R_O$) comprises a metal halide ($M_RX$). For example, the metal halide ($M_RX$) may be selected from the group consisting of $MgCl_2$, NaCl, KCl, LiCl, $BaCl_2$, $CaCl_2$, $BeCl_2$ $AlCl_3$, and any combination thereof.

The composite material may further comprise one or more metals (M). For example, an additional metal incorporated into the composite material during preparation of the composite material. The metal (M) may be selected from the group consisting of titanium, aluminum, vanadium, chromium, niobium, molybdenum, zirconium, silicon, boron, tin, hafnium, yttrium, iron, copper, nickel, bismuth, manganese, palladium, tungsten, cadmium, zinc, silver, cobalt, tantalum, scandium, ruthenium and the rare earths or a combination of any two or more thereof. For example, the other metal, (i.e. metallic element) may be aluminum metal as a solid or liquid.

In a preferred embodiment, the composite material is in the form of particles. The particles may be generally spherical. They may also be regular or irregular in shape. Preferably, the particles have an average particle size of up to 500 μm, more preferably from 20-300 μm.

The metal component ($M_P$) within the composite material generally has a particle size of up to about 1 micron. The surface area to volume ratio of the metal component ($M_P$) in the protective matrix is preferably greater than 6 $m^2$/mL.

In that regard, taking as an example where the composite material is formed by contacting Mg with an excess of $TiCl_4$ in a fluidised bed reactor to form Ti metal dispersed in a $MgCl_2$ matrix, it is thought that at the extreme lower limit of particle size, one molecule of $TiCl_4$ may react with one atom of Mg and produce $MgCl_2$ and $TiCl_2$. Thereafter, one more atom of Mg reacts with $TiCl_2$ and forms a second $MgCl_2$ and a single Ti atom. Therefore, at its limit, it is envisaged that the finely divided metal component ($M_P$) may be present in the protective matrix of $MgCl_2$ on an atomic scale. Such examples would represent true "primary particles" of the metal component ($M_P$). In practice, there is the inherent desire on the part of the metal component ($M_P$) to nucleate or agglomerate (and possibly sinter), especially at nascent sites and in the presence of some local heating, mixing, possible electronic transfer through partially melted salt, etc. As such, it is considered that there may be many atoms coalescing together to form the more realistically viable "primary particles" that would be observed under analysis. These particles may be extremely small, for example on the nano-scale. At some point, however, further aggregation is not possible because, according to this embodiment at least, of "freezing" of the $MgCl_2$ to encapsulate the Ti in its current state of agglomeration, resulting in a frozen sea of $MgCl_2$ with homogeneously dispersed titanium particles. Accordingly, in this particular embodiment, an ultrahigh surface area metal with no oxide barrier layer is completely protected from forming larger particles or otherwise reacting unless the $MgCl_2$ is removed. However, when the protective matrix, in this case $MgCl_2$ is removed (for example by melting), the titanium particles are free to move around and further aggregate and form larger structures, such as shells of Ti. These may be considered "secondary particles". It will be appreciated that these comments are equally relevant to the extreme upper limit of the surface area to volume ratio of the metal component ($M_P$) in the protective matrix.

Another advantageous characteristic of the metal component ($M_P$) of these preferred embodiments of the invention is the lack of a protective oxide layer. The metal component ($M_P$) particles of these embodiments do not have an activation barrier, which correlates with a lower activation energy (increase in reactivity) of the metal component ($M_P$). In addition to the above advantage, generally small particles are highly pyrophoric. The composite material of the preferred embodiments of the invention is, comparatively, not. For conventional metal powders of approximately <10 μm, pyrophoricity becomes a major issue, but can be serious even at much larger sizes (>100 μm) under some conditions. The protective matrix of the composite material of the invention advantageously overcomes this issue.

The method of the invention may further comprise combining the composite material with an additional component prior to or during the treating step. The additional component may be selected from the group consisting of (i) a composite material comprising a matrix of oxidised reductant ($R_O$), for example a metal halide, with one or more metallic elements dispersed in the matrix, (ii) a metallic element or compound; (iii) a non-metallic element or compound, (iv) a metalloid element or compound, and (v) any combination of two or more of these. For example, the composite material may be combined with any one or more of the groups consisting of beryllium, boron, carbon, nitrogen, oxygen, aluminum, silicon, phosphorous, sulphur, scandium, vanadium, chromium, manganese, iron, cobalt, nickel, copper, zinc, gallium, germanium, arsenic, selenium, yttrium, zirconium, niobium, molybdenum, ruthenium, rhodium, palladium, silver, cadmium, indium, tin, antimony, tellurium, hafnium, tantalum, tungsten, rhenium, osmium, iridium, platinum, gold, lead, bismuth, the Rare Earths and compounds thereof.

The metal-containing product ($M_{Prod}$) may consist of the product metal ($M_P$) and the method may comprise recovering the product metal ($M_P$) from the composite material. The method may further comprise a post-treatment of the recovered product metal ($M_P$). For example, the post-treatment comprises, milling, grinding, coating, pressing, heat treating (e.g. aging, annealing, quenching, tempering), rolling, forming, casting, hot or cold isostatic pressing (HIPing or CIP), moulding, melting, sintering, blending, extruding, drawing, forging, turning, welding, atomising and/or spraying.

The method may further comprise pre-treating the composite material prior to the treatment step. For example, the pre-treatment may comprise at least one of compacting, milling and grinding the composite material.

According to another aspect of the invention there is provided metal-containing product ($M_{Prod}$) produced by a method as described above.

The metal-containing product ($M_{Prod}$) formed according to the invention may comprise particulate metal having a particle size of less than 500 μm, preferably from 20-300 μm, or may comprise ingots of the product metal ($M_P$).

In certain embodiments, the product metal ($M_P$) is an alloy, for example an alloy of two or more of titanium, vanadium and aluminum. For example, the alloy may approximate Ti64.

In that regard, it will be appreciated that Ti64 alloy generally refers to an alloy having a chemical composition of 6% aluminum, 4% vanadium, 0.25% (maximum) iron, 0.2% (maximum) oxygen, and the remainder titanium. Ti64 is also commonly referred to as Grade 5 titanium.

In another embodiment, palladium may be incorporated into the composite material to facilitate recovery of Grade 7 titanium. In that regard, Grade 7 titanium contains 0.12 to 0.25% palladium. The small quantity of palladium provides enhanced crevice corrosion resistance at low temperatures and high pH.

It is believed that the particulate metal may be suitable for use in many powder metallurgical processes. In that regard, as mentioned above, it is envisaged that the form of the product metal ($M_P$) recovered, be that in terms of desired shapes and particle sizes of the particles, may be predicted by manipulating the method of recovery, and also manipulating the method of production of the composite material. That is, the size and shape of the particles may be manipulated in order to achieve suitable particles for a particular powder metallurgical process.

The present invention consists of features and a combination of parts hereinafter fully described and illustrated in the accompanying drawings, it being understood that various changes in the details may be made without departing from the scope of the invention or sacrificing any of the advantages of the present invention.

BRIEF DESCRIPTION OF ACCOMPANYING DRAWINGS

To further clarify various aspects of some embodiments of the present invention, a more particular description of the invention will be rendered by references to specific embodiments thereof, which are illustrated in the appended drawings. It should be appreciated that these drawings depict only typical embodiments of the invention and are therefore not to be considered limiting on its scope. The invention will be described and explained with additional specificity and detail through the accompanying drawings in which.

DETAILED DESCRIPTION OF THE PREFERRED EMBODIMENTS

Hereinafter, this specification will describe the present invention according to the preferred embodiments. It is to be understood that limiting the description to the preferred embodiments of the invention is merely to facilitate discussion of the present invention and it is envisioned without departing from the scope of the appended claims.

Figure 1:
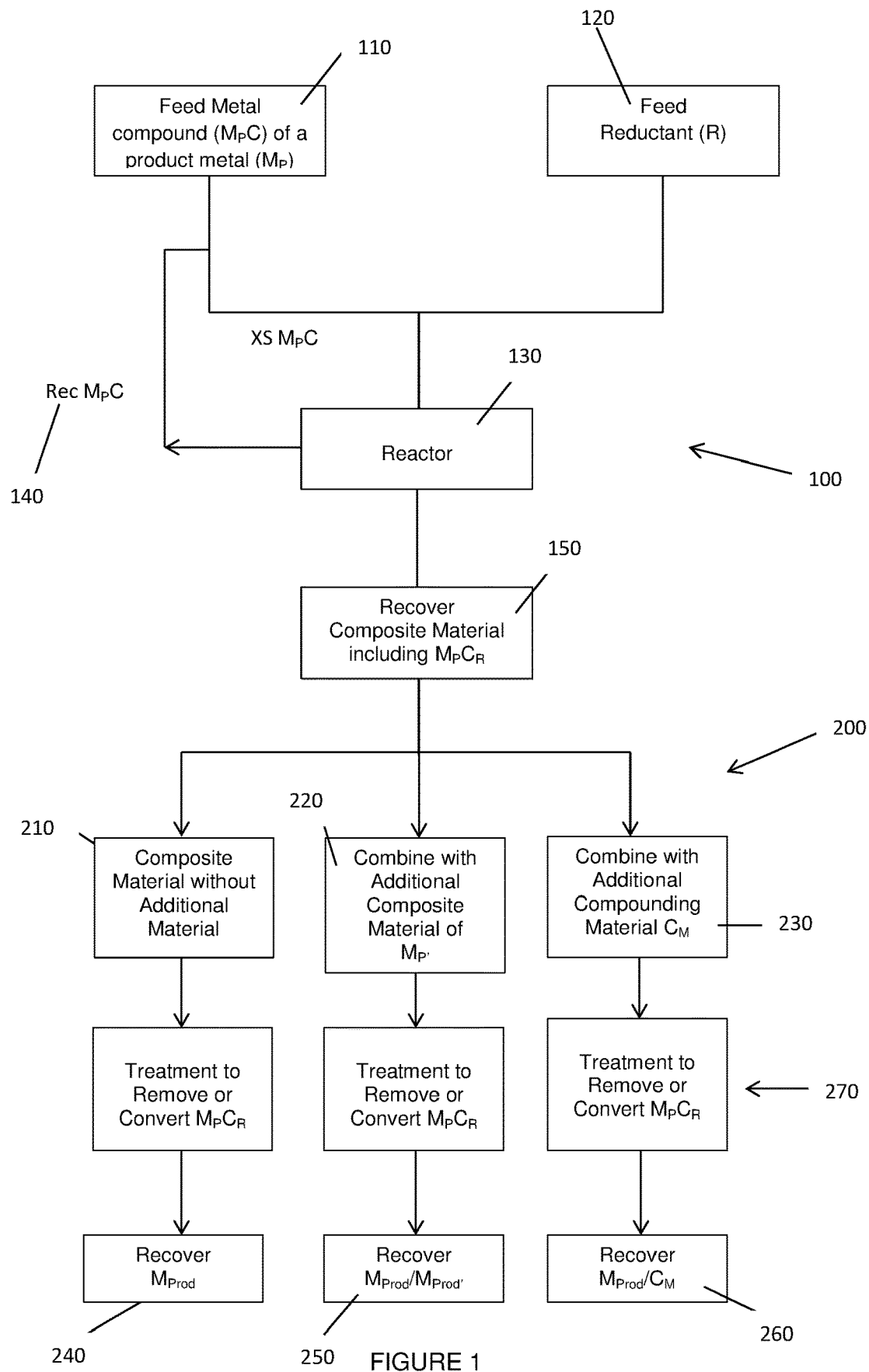
FIG. 1 illustrates a flow chart of a method for the recovery of metal-containing product ($M_{Prod}$) from a composite material, which also illustrates an exemplary method for obtaining a composite material.

Referring to FIG. 1, a method 200 for the recovery of a metal-containing product ($M_{Prod}$) from a composite material is illustrated. Also illustrated for convenience and without any limitation to the method of recovery of the present invention, is an exemplary method 100 for the production of a suitable composite material that contains one or more metal compounds ($M_P C_R$) of the product metal ($M_P$) in one or more oxidation states. We provide the following nonlimiting discussion of the exemplary method 100, followed by a more detailed discussion of the method 200 of the present invention.

According to the method 100 for the recovery of a composite material, metal compound ($M_PC$) 110 of a product metal ($M_P$) and a reductant (R) 120 capable of reducing the metal compound ($M_PC$) 110 of the product metal ($M_P$) are supplied to a reactor 130. The amount of metal compound ($M_PC$) 110 supplied to the reactor 130, including any recycled metal compound ($M_PC$) 140, is in excess relative to the amount of reductant 120 supplied to the reactor 130. Composite material 150 is recovered from the reactor 130. The composite material comprises a matrix of oxidised reductant ($R_O$), product metal ($M_P$) dispersed in the matrix of oxidised reductant ($R_O$), and one or more metal compounds ($M_PC_R$) of the product metal ($M_P$) in one or more oxidation states dispersed in the matrix of oxidised reductant ($R_O$). The composite material may further comprise reductant (R).

The reactor 130, which will be discussed in terms of a fluidised bed reactor with reference to FIG. 1, is run at a temperature that is below the melting point of the oxidised reductant ($R_O$) and, generally, above the melting point of the reductant (R) 120, which may form part of the composite material 150. Where the temperature in the reactor 130 is between the melting point of the reductant (R) 120 and the melting point of the oxidised reductant ($R_O$), for example its oxidised salt, the reaction of the reductant (R) 120 with oxidant results in the formation of a composite material 150 comprised of largely or entirely solid character. This 'freezing' reaction advantageously has the impact of creating finely divided and highly pure reaction products. Without seeking to be bound by theory, it is thought that the particle size of the composite material 150 is such that the finely divided elements comprised within are sufficiently small that they interact differently with visible light than their bulk counterparts. For example, they may appear black or dark in colour. The finely divided structure of the composite material 150 has advantages compared with composites of analogous nominal compositions that do not have the same finely divided structure. These advantages will be elucidated in more detail below.

Where the reductant (R) 120 is fed into the reactor 130 as a solid or solid particulate, the prevailing conditions in the reactor 130 ensure, with sufficient time, the melting of the reductant 120. The time required for melting of solid reductant 120 depends upon numerous factors, including the feed mechanism, whether the reductant 120 is fed with other materials, the temperature of the reactor 130, the reaction intensity of the reactor 130 per unit volume, the particulate density of the reductant 120 feed at any single location and, if other reductant or reagent or inert streams are in or are entering into the reactor, the proximity to these components and their respective temperatures when impinging on particles of the reductant 120.

The interaction of the reductant (R) 120 upon contacting other surfaces in the reactor 130 will depend on its phase at that time. If the reductant 120 particle is solid, it is possible the reductant 120 particle will collide and rebound. It will then continue to interact with other surfaces and environments in the reactor 130.

If the reductant 120 particle has a molten external surface and solid inner surface, it is possible the particle will adhere to any surface it impacts, creating a composite of the two objects. The particle will then continue to interact with other surfaces and environments in the reactor 130.

If the reductant 120 particle is molten when it interacts with other surfaces, it may wet the surface. Depending upon the nature of the solid-liquid interaction the thickness of the layer formed will vary. It is considered that this may be manipulated through varying intensity of interactions, density of reductant 120 feed, temperature and time, etc.

Whether the end location of molten reductant in the reactor 130 is as a stand-alone mass, wetted on a surface or combined with other surfaces, at some point it will interact with oxidant and react. At this point the thickness or the wetted layer or size of the molten mass or particle is considered of some importance in determining the extent of reaction of the reductant (R) 120 and the morphology of the final composite material 150.

If the particle or wetted layer is sufficiently large or not completely molten at this time, the freezing nature of the reaction as described previously can result in a proportion of the reductant (R) becoming encapsulated by the composite material 150. Where the surface exposed to oxidant reacts to form a solid it may form a barrier (i.e. shell) that may restrict or eliminate the participation of the remaining reductant in further reduction. If the particle is sufficiently small or the wetted layer sufficiently thin, for example if the thickness of the reaction layer is equivalent to the radius of the particle or the thickness of the wetted layer, the process can consume the majority if not all of the reductant (R).

The amount of oxidant in the reactor relative to reductant (R) will be an important factor in determining the probability of the above mentioned interactions. Weighting of one form of interaction over others can be manipulated by changing operating conditions, feed forms, etc. The nature of surfaces in the reactor available for interaction, potential for sequential ordering and forms in which the reductant and oxidant are brought into contact can result in composites being formed which have diverse characteristics. These may include, without limitation, excess or fully consumed reductant, layers of composite, layers of composite with magnesium interstitial layers. It is thought that novel structured materials may be formed by sequential layering of dissimilar layers of prescribed composition.

Once the composite material is recovered 150, it may be stored under suitable conditions for later use The present invention relates to a method 200 for the recovery of a metal-containing product ($M_{Prod}$) from a composite material 150. In certain embodiments, the method comprises the recovery of the product metal ($M_P$) directly from the composite material 210, or may comprise recovery after combining the composite material with composite material of other product metal (MO 220, and/or other compounding material ($C_M$) 230. As such, it is envisaged that various products may be recovered, including without limitation a metal-containing product ($M_{Prod}$) 240, an alloy or mixture of metal-containing product ($M_{Prod}/M_{Prod'}$) 250, and a mixture or composite metal-containing product ($M_{Prod}/C_M$) 260. In any of these recovery processes, it may also be desirable to recover reductant (R). Once a desired composite material is formulated (i.e. with or without additional material), it is treated 270 to recover the metal-containing product 240, 250, 260.

Treatment 270 of the composite material aim to at least partially remove the one or more metal compounds ($M_PC_R$) from the matrix of oxidised reductant ($R_O$) to form the metal-containing product ($M_{Prod}$). Generally, the aim of the treatment step 270 is to substantially completely remove the one or more metal compounds ($M_PC_R$) from the matrix of oxidised reductant ($R_O$).

It is currently envisaged that two methods of treatment 270 are particularly useful for the removal of the one or more metal compounds ($M_PC_R$) from the matrix of oxidised reductant ($R_O$). These include distillation, particularly vacuum distillation, and reduction of the one or more metal compounds ($M_PC_R$) to product metal ($M_P$) in the presence of a reductant. These two options may be performed independently, or in combination. It will be appreciated, though, that other suitable options may be employed. For example, the treatment step 270 may suitably comprise melting the composite material and subsequent separation of the one or more metal compounds ($M_PC_R$).

The treatment step 270 may also result in the removal of the matrix of oxidised reductant ($R_O$) from the composite material. As an example, the one or more metal compounds ($M_PC_R$) and the oxidised reductant ($R_O$) may be removed from the composite material by vacuum distillation. The treatment 270 may further result in the removal of reductant (R), if present, which may be recycled to the reductant feed 120, or be otherwise recovered. In such cases, the metal-containing product 240, 250, 260 may consist of product metal ($M_P$) 240, an alloy or mixture of product metals ($M_P/M_{P'}$) 250, and a mixture or composite ($M_P/C_M$) 260.

Aside from the different compositional inputs into the recovery process as described above, the finely divided nature of the product metal ($M_P$) in the composite material 150, is encased in materials chemically inert to itself by the nature of their generation. Product metal of similar compositional properties but without the same physical characteristics engendered by the encasement process will not respond to the same recovery process with analogous results. That is, the surface is free from any protective or passivation layer meaning that it will respond differently to physical interactions than its macroscopic bulk counterpart.

The individual components of product metal encased in inert material provide for building blocks that may or may not combine to various extents and by different driving forces through the process of recovery to yield the product metal ($M_P$). As such, the conditions under which the liberation of the product metal ($M_P$) from the composite matrix proceeds and the conditions throughout the recovery process have a significantly determinative impact on the way in which each divided product metal building block interacts with others, and ultimately on the manner in which they may or may not combine and the morphology and microstructure of the recovered product metal.

EXAMPLES

The following examples are provided for exemplification only and should not be construed as limiting on the invention in any way.

Example 1

CP2 Titanium Recovery from a Predominantly MgCl$_2$ Matrix 30 g of composite material, black in colour, in spherical particulate form comprising a matrix of magnesium chloride, titanium metal, magnesium and quantities of titanium sub-halides (TiCl$_2$ and TiCl$_3$) was placed in a vessel made from stainless steel. The vessel was placed under vacuum at a pressure of approximately 0.01 kPa. An argon purge was supplied at a rate of 10 mg/min. The vessel was then heated externally to a temperature of 900° C. at a heating rate of 31° C. per minute. The vessel was then left at a temperature of 900° C. for one hour before being cooled to room temperature.

The vessel was purged with air and the remnant material was recovered from the vessel, comprising approximately 5 g of titanium metal. The metal was in the form of loosely sintered spheres with size approximately one half of the particulate size of the composite material fed into the vessel.

The recovery process produced commercially pure grade 2 titanium.

Example 2

Combination of Composite Materials 15 g of composite material, black in colour, in spherical particulate form comprising a matrix of magnesium chloride, titanium metal, aluminum metal, magnesium and quantities of titanium sub-halides (TiCl$_2$ and TiCl$_3$) was combined with 15 g of composite material, black in colour, in spherical particulate form comprising a matrix of magnesium chloride, titanium metal, vanadium metal, magnesium and quantities of titanium sub-halides (TiCl$_2$ and TiCl$_3$) and possibly vanadium sub-halides.

The total of 30 g of composite material was ground under inert conditions to form a homogeneous composition and then placed in a vessel made from stainless steel. The degree of milling could be altered for differing levels of uniformity. The vessel was placed under vacuum at a pressure of approximately 0.01 kPa. An argon purge was supplied at a rate of 10 mg/min. The vessel was then heated externally to a temperature of 900° C. at a heating rate of 31° C. per minute. The vessel was then left at a temperature of 900° C. for one hour before being cooled to room temperature.

The vessel was purged with air and the remnant material was recovered from the vessel, comprising approximately 5 g of titanium, aluminum and vanadium containing metal in proportion with the sum of the product metal in the input composite material. The metal was in the form of closely packed sintered particles with irregular shape.

Example 3

Liberation of Product Metal from Predominantly MgCl$_2$ Matrix at Atmospheric Conditions 30 g of composite material, black in colour, in spherical particulate form comprising a matrix of magnesium chloride, titanium metal, magnesium and quantities of titanium sub-halides (TiCl$_2$ and TiCl$_3$) was ground under inert conditions and then placed in a vessel made from stainless steel. The degree of milling and or sieving could be altered for differing sizing and morphology of initial particulate size of composite material. The vessel was purged with argon at atmospheric pressure and then then heated externally to a temperature of 900° C. at a heating rate of 31° C. per minute. The vessel was then left at a temperature of 900° C. for one hour before being cooled to room temperature.

The contents of the vessel was recovered and found to be a white and silver coloured mass comprised of titanium metal and magnesium chloride. There was no appearance of green or violet colouring to indicate presence of titanium sub-halides in the salt phase.

The mass was broken up and milled to a powder and returned to the stainless steel vessel. The vessel was placed under vacuum at a pressure of approximately 0.01 kPa. An argon purge was supplied at a rate of 10 mg/min. The vessel was then heated externally to a temperature of 900° C. at a heating rate of 31° C. per minute. The vessel was then left at a temperature of 900° C. for one hour before being cooled to room temperature.

The vessel was purged with air and the remnant material was recovered from the vessel, comprising approximately 5 g of titanium metal.

Under the atmospheric process the product metal was liberated from the protective matrix and enabled to consolidate to a degree by sintering. Similarly, melting of the matrix provides the opportunity for partially reduced or oxidised compounds to be liberated from the matrix structure and a significantly enhanced opportunity to interact and react with other compounds in the matrix, or be removed by boiling.

Example 4

Recovery of Metal Containing Product with Reduced Sub-halide Content 50 mg of composite material, black in colour, in angular particulate form comprising a matrix of magnesium chloride, titanium metal, magnesium and quantities of titanium sub-halides ($TiCl_2$ and $TiCl_3$) was placed in an open alumina cup. The cup was placed in a vacuum furnace at a pressure of approximately 0.01 kPa. An argon purge was supplied at a rate of 2 mg/min. The furnace was then heated to a temperature of 500° C. at a heating rate of 100° C. per minute, which under vacuum is sufficient for removing titanium and promoting the disproportionation of titanium sub-halides. The vessel was then left at a temperature of 500° C. for one hour before being cooled to room temperature.

Figure 2:
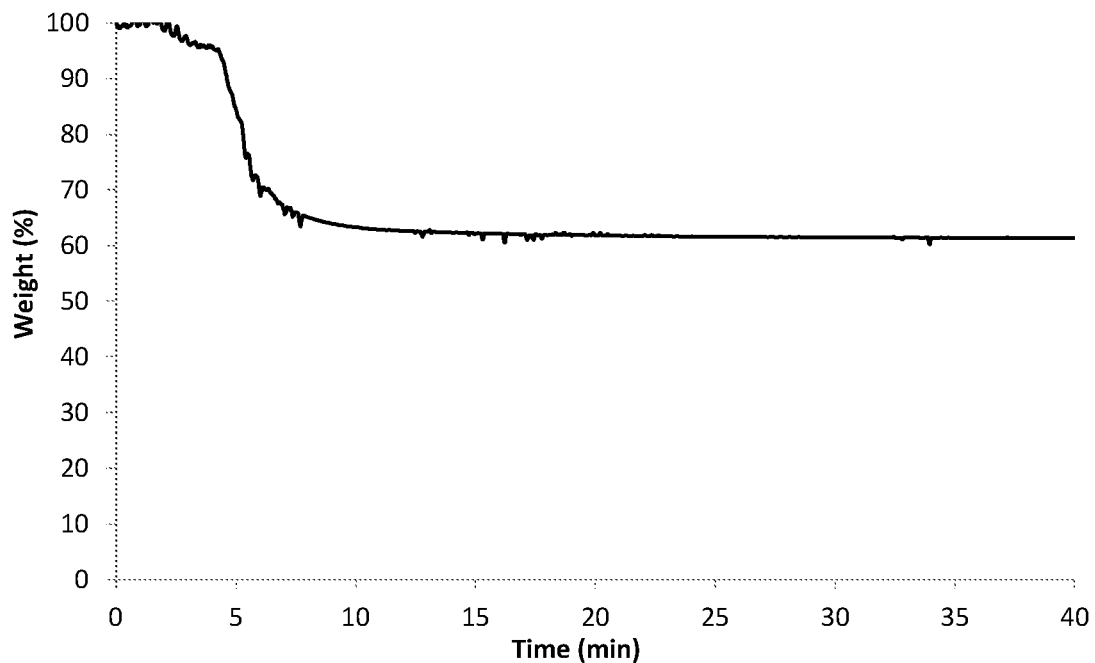
FIG. 2 illustrates weight loss of titanium composite rapidly heated to 500° C. and held at that temperature for a period of time according to example 4.

FIG. 2 shows the loss of weight of the material over time in the process. It can be seen the weight stabilises after a short period.

The remnant material was recovered from the vessel, comprising approximately 30 mg of metal containing composite material with a substantially reduced sub-halide content. This composite could be put through further recovery processes, where the impact of the significant volatile sub-halide content would be reduced or eliminated. Such impacts could include significant increase in total volatile content, difficulty in controlling sub-halide conversion to metal or removal.

Example 5

Recovery of Metal Containing Product with Reduced Sub-halide Content

A titanium composite containing significant sub-halide content was passed through vacuum at 600° C. with a residence time of 2 hours. The feed composite comprised uniform black spheres with particle size of <2 mm.

Upon exiting the heated zone the composite material had become lighter in colour indicating some form of chemical process has occurred.

Figure 3:
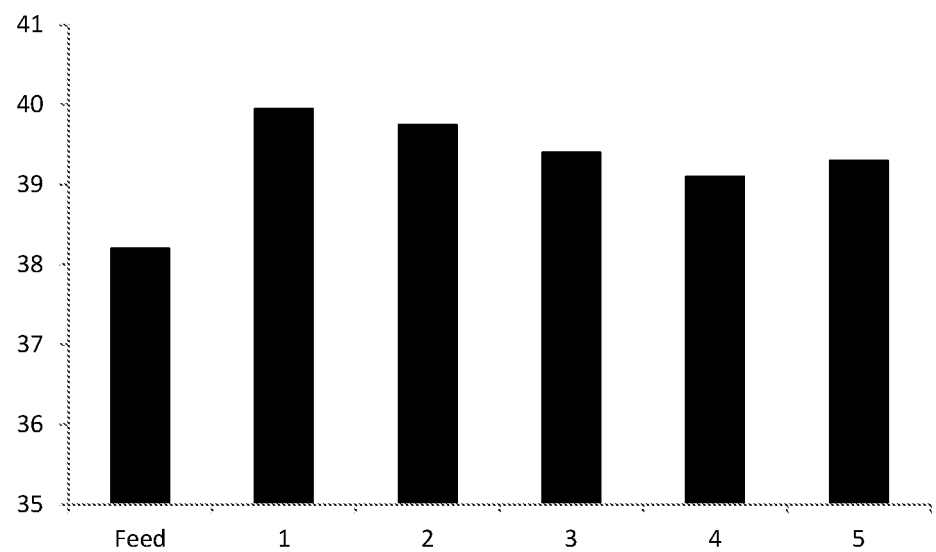
FIG. 3 shows the total content of titanium and magnesium as determined by XRF of the feed material of Example 5 and several subsequent samples of the recovered material.
Figure 4:
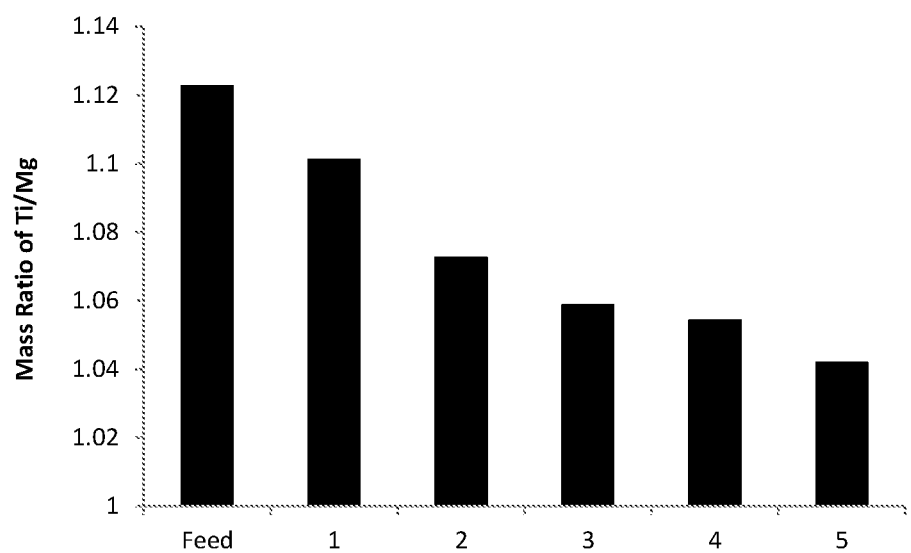
FIG. 4 shows a similar plot to FIG. 3, but separately shows the individual content of titanium and magnesium.

FIG. 3 shows the total content of titanium and magnesium as determined by XRF of the feed material and several subsequent samples of the recovered material. FIG. 4 shows a similar plot but separately shows the individual content of titanium and magnesium.

The increase in total metal ion content between the deed and the recovered material as shown in FIG. 3 indicates that the metal component of the composite has been concentrated in the process. FIG. 4 shows that the titanium content of the recovered material is reduced after processing, which when combined with the total metal content increasing suggests that a titanium halide phase has been removed by processing without impacting the remaining composite constituents.

It is noted that the process reduces the mass ration of titanium to magnesium from 1.12 substantially towards the theoretical ratio for a two-phase mixture of titanium metal and magnesium chloride of 0.985. As such the stability and predictability of the recovered composite to subsequent processing will be increased.

Example 6

Recovery of Composite Through Alteration of the Encapsulating Salt Melting Point 2 g of composite material black in colour, in angular particulate form comprising a matrix of magnesium chloride, titanium metal, magnesium and quantities of titanium sub-halides ($TiCl_2$ and $TiCl_3$), 7.83 g of lithium chloride and 10.01 g of potassium chloride were milled together to form a uniform grey powder.

50 mg of the grey composite material was placed in an open alumina cup. The cup was placed in a furnace under an argon atmosphere. The furnace was then heated to a temperature of 500° C. at a heating rate of 10° C. per minute. The material was held at temperature for 20 minutes before cooling. The composite displayed an endotherm around 350° C. indicating the composite had melted. This is in contrast to the melting point of the original composite of around 715° C.

The cup was then placed in a vacuum furnace at a pressure of approximately 0.01 kPa. An argon purge was supplied at a rate of 2 mg/min. The furnace was then heated to a temperature of 1100° C. at a heating rate of 10° C. per minute. The sample was shown to melt again at approximately 350° C. Surprisingly all volatiles were removed below 700° C., leaving titanium metal behind. This represents a significant reduction in the temperature required to recover the metal component based on the original composite composition.

Example 7

Recovery of Metal from a Composite with Containing Aluminum 50 mg of composite material black to grey in colour, in angular particulate form comprising a matrix of aluminum chloride, titanium metal, aluminum and quantities of titanium sub-halides ($TiCl_2$ and $TiCl_3$), was placed in an open alumina cup. The cup was placed in a furnace under an argon atmosphere. The furnace was then heated to a temperature of 900° C. at a heating rate of 10° C. per minute. The material was held at temperature for 20 minutes before cooling. The composite displayed an endotherm around 650° C. indicating the melting of aluminum metal. The composite also exhibited exotherms above and below 650° C. commensurate with the formation of titanium aluminides. In excess of 10% loss of weight of the sample was exhibited around 500° C. consistent with the removal of $TiCl_3$. Greater than 10% loss of weight was exhibited above 850° C. commensurate with the removal of $TiCl_2$.

Inspection by SEM indicated that the recovered metal comprised titanium-aluminum composition with low residual chloride content.

While the above examples primarily employ magnesium chloride as the matrix of oxidised reductant ($R_O$), those in the art will appreciate that other metals, including but not limited to other magnesium halides and halides of sodium, potassium, lithium and barium, would be expected to achieve similar results given their similar properties.

Unless the context requires otherwise or specifically stated to the contrary, integers, steps or elements of the invention recited herein as singular integers, steps or elements clearly encompass both singular and plural forms of the recited integers, steps or elements.

It will be appreciated that the foregoing description has been given by way of illustrative example of the invention and that all such modifications and variations thereto as would be apparent to persons of skill in the art are deemed to fall within the broad scope and ambit of the invention as herein set forth.

The invention claimed is:

1. A method for the recovery of a metal-containing product ($M_{Prod}$) comprising:
   providing a composite material comprising a matrix of oxidized reductant ($R_O$), a product metal ($M_P$) dispersed in said matrix of oxidized reductant ($R_O$), and one or more metal compounds ($M_PC_R$) of said product metal ($M_P$) in one or more oxidation states dispersed in said matrix of oxidized reductant ($R_O$); and
   treating said composite material to at least partially remove said one or more metal compounds ($M_PC_R$) from said matrix of oxidized reductant ($R_O$) to form a metal-containing product ($M_{Prod}$).

2. A method according to claim 1, wherein said treatment step comprises distilling said one or more metal compounds ($M_PC_R$) from said matrix of oxidized reductant ($R_O$).

3. A method according to claim 2, wherein said distillation at least partially removes said oxidized reductant ($R_O$).

4. A method according to claim 2, wherein said distillation results in at least one of (i) volatilisation of said one or more metal compounds ($M_PC_R$), and (ii) reduction of said one or more metal compounds ($M_PC_R$), in the presence of a reductant (R), to said product metal ($M_P$).

5. A method according to claim 2, wherein said one or more metal compounds ($M_PC_R$) and, optionally, said oxidized reductant ($R_O$) are removed from the composite material by vacuum distillation.

6. A method according to claim 5, wherein said vacuum distillation is conducted under inert conditions at a pressure of from 0.01 to 0.015 kPa.

7. A method according to claim 5, wherein said vacuum distillation is conducted at conditions at which sublimation of said oxidized reductant ($R_O$) occurs.

8. A method according to claim 7, wherein said oxidized reductant ($R_O$) comprises magnesium chloride and said vacuum distillation is conducted at a temperature of from 700° C. to 950° C., and wherein said product metal ($M_P$) optionally comprises at least titanium.

9. A method according to claim 1, wherein said treatment step comprises reducing said one or more metal compounds ($M_PC_R$) of said product metal ($M_P$) to said product metal ($M_P$) in the presence of a reductant (R).

10. A method according to claim 9, wherein said reductant (R) is included within said matrix of oxidized reductant ($R_O$).

11. A method according to claim 9, wherein said reductant (R) is selected from the group consisting of Mg, Na, K, Li, Ba, Ca, Be and Al.

12. A method according to claim 1, wherein said treatment step comprises melting said composite material and recovering the metal-containing product ($M_{Prod}$) from the melt.

13. A method according to claim 12, wherein melting is conducted at a temperature below the individual melting temperatures of each component of the matrix by formation of a hypoeutectic or hypereutectic composition.

14. A method according to claim 12, wherein recovering the metal-containing product ($M_{Prod}$) from the melt comprises subjecting the melt to conditions at which the product metal ($M_P$), the one or more metal compounds ($M_PC_R$) and the oxidized reductant ($R_O$) form separate layers in the melt and recovering the product metal ($M_P$) layer.

15. A method according to claim 12, wherein recovering the metal-containing product ($M_{Prod}$) from the melt comprises dissolution of components of the composite material.

16. A method according to claim 1, wherein said one or more metal compounds ($M_PC_R$) of said product metal ($M_P$) in one or more oxidation states comprise one or more metal halides ($M_PX$) of said product metal ($M_P$).

17. A method according to claim 16, wherein said one or more metal compounds ($M_PC_R$) of said product metal ($M_P$) in one or more oxidation states comprises a metal halide selected from the group consisting of halides of titanium, aluminium, vanadium, chromium, niobium, molybdenum, zirconium, silicon, boron, tin, hafnium, yttrium, iron, copper, nickel, bismuth, manganese, palladium, tungsten, cadmium, zinc, silver, cobalt, tantalum, scandium, ruthenium and the rare earths or a combination of any two or more thereof.

18. A method according to claim 16, wherein said one or more metal compounds ($M_PC_R$) of a product metal ($M_P$) in one or more oxidation states comprises at least two metal halides selected from the group consisting of halides of titanium, aluminium and vanadium.

19. A method according to claim 1, wherein said oxidized reductant ($R_O$) comprises a metal halide ($M_RX$) selected from the group consisting of $M_gCl_2$, NaCl, KCl, LiCl, $BaCl_2$, $CaCl_2$, $AlCl_3$ and $BeCl_2$.

20. A method according to claim 1, wherein said composite material further comprises one or more metal (M) selected from the group consisting of titanium, aluminium, vanadium, chromium, niobium, molybdenum, zirconium, silicon, boron, tantalum, tin, hafnium, yttrium, iron, copper, nickel, lithium, bismuth, manganese, palladium and the rare earths, or a combination of any two or more thereof.

21. A method according to claim 1, wherein said composite material is in the form of particles having an average particle size of up to 500 μm.

22. A method according to claim 1, further comprising combining said composite material with an additional component selected from the group consisting of (i) a composite material comprising a matrix of oxidized reductant ($R_O$) with one or more metallic elements dispersed in the matrix, (ii) a metallic element or compound; (iii) a non-metallic element or compound, (iv) a metalloid element or compound, and (v) any combination of two or more of these.

23. A method according to claim 1, wherein said metal-containing product ($M_{Prod}$) consists of said product metal ($M_P$) and said method comprises recovering said product metal ($M_P$) from said composite material.

24. A method according to claim 1, further comprising pre-treating said composite material prior to said treatment step, wherein said pre-treatment comprises at least one of compacting, milling and grinding said composite material.

25. A method according to claim 6, wherein said vacuum distillation is conducted under argon gas.

26. A method according to claim 13, wherein melting is conducted at a temperature below the individual melting temperatures of each component of the matrix by formation of a eutectic composition.

27. A method according to claim 15, wherein recovering the metal-containing product ($M_{Prod}$) from the melt comprises dissolution of the one or more metal compounds ($M_P C_R$) and oxidized reductant ($R_O$).

28. A method according to claim 21, wherein the average particle size is from 20-300 μm.

29. A method according to claim 22, wherein the oxidized reductant ($R_O$) comprises metal halide.

* * * * *